(No Model.)
H. E. KIRSTEIN.
SPECTACLE FRAME.
No. 412,395.           Patented Oct. 8, 1889.
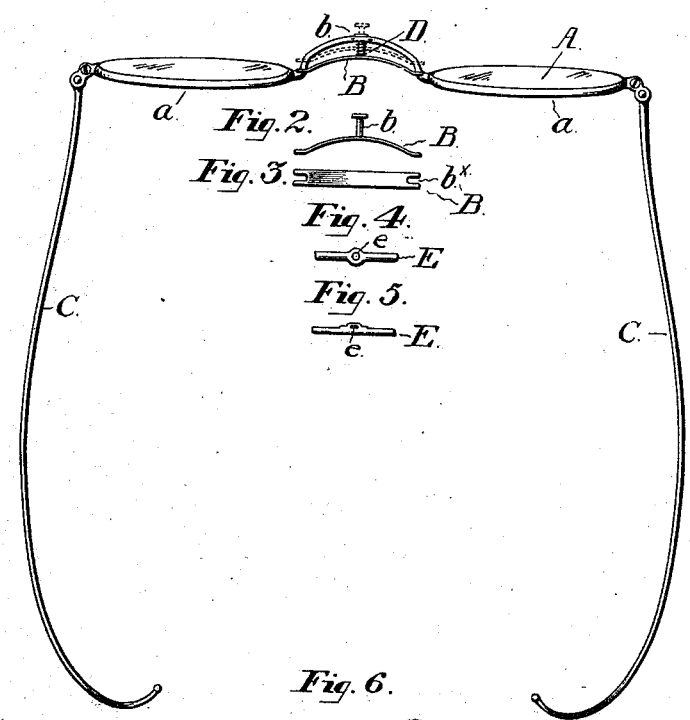
WITNESSES:
J. Norman Dixon,
P. H. Nagle
INVENTOR
Henry E. Kirstein
By his attorneys
W. C. Strawbridge
J. Bonsall Taylor

UNITED STATES PATENT OFFICE.

HENRY E. KIRSTEIN, OF ROCHESTER, NEW YORK.

SPECTACLE-FRAME.

SPECIFICATION forming part of Letters Patent No. 412,395, dated October 8, 1889.

Application filed June 19, 1889. Serial No. 314,797. (No model.)

*To all whom it may concern:*

Be it known that I, HENRY E. KIRSTEIN, a citizen of the United States, residing at Rochester, New York, have invented certain Improvements in Spectacles, of which the following is a specification.

My invention relates to the frames of spectacles as opposed to those of eye glasses, and its object is to obviate the indentation of the nose of the wearer arising from the pressure of the bridge owing principally to the pull of the temples, and to render the wearing of the spectacles more comfortable.

To such end, my invention comprehends spectacles the bridge of which is self-adjustable with respect to the lenses, a result accomplished by interposing one or more compressible or resilient cushions in the form, preferably, of one or more springs between the lenses, or their frames, and that portion of the bridge proper or uniting bow of the lenses that bears upon the wearer's nose and sustains the weight of the spectacles.

In order to effectuate the broad idea of the invention as above indicated many constructions can be resorted to, and in the accompanying drawings I represent five, alike embodying the principle residing in the invention, and differing only in the form of application.

In the accompanying drawings, Figure 1 is an under plan view of a pair of spectacles embodying my improvements. Fig. 2 is a side elevational view, and Fig. 3 an under plan view of the nose rest shown in the spectacles of Fig. 1. Fig. 4 is an under plan view of the uniting bow of the spectacles shown in Fig. 1, showing the orifice through which the stem passes, and Fig. 5 is a similar view showing a modified form of said orifice. Fig. 6 is a fragmentary plan view, and Figs. 7 and 8 fragmentary perspective details, of so much of spectacles embodying a modification of my improvement as is necessary to illustrate said modification. Fig. 9 is a fragmentary detail of a modified form of spring. Figs. 10, 11, and 12, are views correspondingly similar to Figs. 6, 7, and 8, of another modification. Fig. 13 is a plan, and Fig. 14 a perspective detail, of portions of another modification of my invention, sufficient to illustrate such modification.

Similar letters of reference indicate corresponding parts.

In the drawings I have represented spectacles the lenses of which are retained in metal frames or rims. It is, however, to be understood that the improvement is applicable to spectacles the lenses of which are rimless.

In the drawings, A represents the lenses, and $a$ the lens frames.

C are the temples; B is the nose rest portion, or nose rest, whether it be the connecting bridge itself as shown in the forms of Figs. 6, 9, 10, and 13, or an attachment thereto in the nature of a false or supplemental bridge as shown in Fig. 1; and D are the cushioning devices, being springs by the direct or indirect interposition of which between the nose rest and the lenses, the self-adjustability of the nose rest portion proper with respect to the lenses is secured.

Describing now the various practical embodiments of the foregoing elements, all of which as co-operating elements are necessarily common to spectacles embodying my invention, and referring in turn to the several modifications represented,—in the form shown in Figs. 1 to 5 inclusive, the nose rest B is connected with the lens frames by being provided with a headed stem $b$ passing through an orifice or sleeve $e$ in a lens-uniting bow E, and by being provided with notches $b^x$ in its extremities which straddle said uniting bow. The adjustment of this nose piece with respect to the lenses is accomplished by the interposition between the under surface of the uniting bow and the upper or outer surface of the nose rest, of a spiral spring D encircling the stem. In the normal position of parts, or that represented in Fig. 1, the normal expansion of the spring maintains the nose rest in the position indicated in full lines,—while the position which said rest assumes in its self-adjustment under the weight of the lenses and the pull of the temples in the application of the spectacles to the nose, is represented in dotted lines.

In the construction represented in Figs. 6, 7, and 8, the nose rest B is at each extremity provided with a headed stem $b$, each of which respectively passes through the bore of a sleeve or bearing $a^x$ internally conformed to the external conformation of said stem, which is other than circular in cross-section,—a construction resorted to in order to prevent the rotation of the lenses with respect to their supporting stems. Coiled springs D encircling the stems in interposition between the sleeves and the extremities of the nose rest, permit of the self-adjustment of the latter with respect to the lenses. As is apparent, but particularly represented in Fig. 8, the inclination of the axis of the bore of each sleeve with respect to its lens frame, may be such as the desired inclination of the nose rest may render necessary; although, of course, the same result can be produced by the bending of the nose piece into the desired plane.

In Fig. 9 which represents a construction identical with that represented in Fig. 6, the spring D is a C-spring as opposed to a spiral, its extremities being bent to encircle the stem and receive the thrust, and its belly performing the function of the cushion device.

In the construction represented in Figs. 10, 11, and 12, the stems between the nose rest and the lens frames are each made in two parts (or longitudinally split, so to speak), which parts are adapted to slide longitudinally of their axes the one past the other, and which are connected by sleeves in the form of collars $b^2$ one of each of which, as shown in Figs. 11 and 12, is rigidly secured to one member or half of the stem, while through it the other member or half slides. Between these collars and encircling these divided stems are, to effectuate the adjustability of the nose-rest, applied the spiral springs D, the slipping of the respective sections of the stems past each other and the consequent compression of the collar-inclosed springs, securing such result.

In the construction represented in Figs. 13 and 14, the sleeves $a^x$ or bearings applied to the lens frames, are, as in the constructions of Figs. 6 and 9 hollow, but are inclosed at both ends, are slotted longitudinally as at $a^2$, Fig. 14, along both their sides. These sleeves contain within them the spiral springs D, which are compressed by the thrust of followers $b^3$ formed on the extremities of the nose rest B and conformed to the hollow interiors of the sleeves. At its extremital portions the nose rest on each side of the follower is adapted to travel in the slots $a^2$, and thereby to maintain the sleeves against possibility of rotation with respect to the nose rest.

In Fig. 14 the parts are shown detached. The cap, which, when the parts are in place, incloses the inner end of the sleeve, is conveniently connected with said sleeve by solder, although, of course, it may be made as a screw plug or cap. As is apparent the operation of the springs in this construction is identical with that of their operation in the other constructions already described.

Having thus described my invention, I claim:—

1. As an article of manufacture, a spectacle frame having a self-adjustable nose rest or uniting bridge.

2. In combination with the lens frames, lenses, and temples of spectacles, a spring-controlled nose-piece adjustable with respect to said lenses and lens frames, substantially as set forth.

3. As an article of manufacture, a spectacle frame, of which that portion which rests upon the nose of the wearer, is capable of an independent movement with respect to the lenses, substantially as set forth.

4. As an article of manufacture, a spectacle frame, of which that portion which rests upon the nose of the wearer, is free to move with respect to the lenses, and is controlled in such movement by a spring device, substantially as set forth.

5. As an article of manufacture, a spectacle frame, of which that portion which rests upon the nose of the wearer, is mounted upon slide bearings so as to be capable of an independent movement with respect to the lenses, and is controlled in such movement by spring devices, substantially as set forth.

6. As an article of manufacture, a spectacle frame, within the uniting bow of which is resiliently secured a supplemental nose bearing piece, substantially as set forth.

7. As an article of manufacture, a spectacle frame, a uniting bow, a supplemental nose bearing piece extremitally fitted to slide upon the sides of the uniting bow, and a spring interposed between said supplemental nose bearing piece and a rigid portion of the spectacle frame, substantially as set forth.

8. As an article of manufacture, a spectacle frame, a uniting bow embodying an aperture, a supplemental nose bearing piece mounted within said uniting bow, and provided with a stem which is entered within the aperture of the uniting bow, and a spring interposed between said uniting bow and supplemental nose bearing piece, substantially as set forth.

9. As an article of manufacture, a spectacle frame, a uniting bow embodying an aperture, a supplemental nose bearing piece, extremitally fitted to slide upon the sides of the uniting bow and provided with a stem which is entered within the aperture of the uniting bow, and a spring interposed between said uniting bow and supplemental nose bearing piece, substantially as set forth.

In testimony that I claim the foregoing as my invention I have hereunto signed my name this 3rd day of June, A. D. 1889.

HENRY E. KIRSTEIN.

In presence of—
  LOUIS E. KIRSTEIN,
  E. KIRSTEIN.